(12) United States Patent
James

(10) Patent No.: US 7,329,350 B2
(45) Date of Patent: Feb. 12, 2008

(54) FILTRATION SYSTEM

(75) Inventor: Ron James, Temecula, CA (US)

(73) Assignee: Aqua Ultraviolet, Temecula, CA (US)

( * ) Notice: Subject to any disclaimer, the term of this patent is extended or adjusted under 35 U.S.C. 154(b) by 0 days.

(21) Appl. No.: 11/224,270

(22) Filed: Sep. 12, 2005

(65) Prior Publication Data

US 2007/0056903 A1    Mar. 15, 2007

(51) Int. Cl.
C02F 3/06    (2006.01)
(52) U.S. Cl. ............... 210/616; 210/629; 210/150; 210/170.02
(58) Field of Classification Search ............... 210/616, 210/617, 618, 629, 150, 151, 280, 167.22, 210/167.25, 170.02
See application file for complete search history.

(56) References Cited

U.S. PATENT DOCUMENTS

| | | | |
|---|---|---|---|
| 278,800 | A | 6/1883 | Kline |
| 581,050 | A | 4/1897 | Wentz |
| 2,461,619 | A | 2/1949 | Wolcott |
| 2,702,715 | A | 2/1955 | Andrews |
| 3,128,051 | A | 4/1964 | Smith |
| 3,493,116 | A | 2/1970 | Edmiston |
| 3,547,270 | A | 12/1970 | Kass |
| 3,707,233 | A | 12/1972 | Lerner |
| 3,834,537 | A | 9/1974 | Brett |
| 3,957,931 | A | 5/1976 | Ellis et al. |
| 4,009,099 | A * | 2/1977 | Jeris ............... 210/151 |
| 4,105,555 | A | 8/1978 | Pease |
| 4,113,616 | A | 9/1978 | Kaes |
| 4,122,011 | A | 10/1978 | Strigle, Jr. |
| 4,200,536 | A | 4/1980 | Kaufman |
| 4,257,352 | A | 3/1981 | Habegger |
| 4,297,209 | A | 10/1981 | DeVisser et al. |
| 4,415,454 | A * | 11/1983 | Fuchs .................. 210/617 |
| 4,566,971 | A * | 1/1986 | Reimann et al. ......... 210/616 |
| 4,623,464 | A * | 11/1986 | Ying et al. ........... 210/616 |
| 4,663,046 | A * | 5/1987 | Feldkirchner et al. ...... 210/616 |
| 4,683,062 | A | 7/1987 | Krovak et al. |
| 4,753,726 | A | 6/1988 | Suchanek |
| 4,800,021 | A | 1/1989 | Desbos |
| 4,884,584 | A | 12/1989 | Smith |
| RE33,438 | E | 11/1990 | Stewart |
| 5,084,164 | A | 1/1992 | Del Rosario |
| 5,126,042 | A * | 6/1992 | Malone ............... 210/150 |
| 5,160,039 | A | 11/1992 | Colburn |

(Continued)

OTHER PUBLICATIONS

"System 2000; The Ultmate Pond Filter", Aqua UltraViolet Sales Brochure.

(Continued)

*Primary Examiner*—Christopher Upton
(74) *Attorney, Agent, or Firm*—Knobbe Martens Olson & Bear LLP (57) ABSTRACT

A filtration system comprises a filtration container housing filter media treated to reduce waste in water pumped into the filtration container. An impeller is mounted on the filtration container and forces water and filter media within the container to move within the container. Advantageously, movement within the container, and interaction between, the water and filter media within the container are increased through use of the impeller. The impeller may also cause the water and filter media within the container to move in a substantially non-repeating path within the container so that interaction of the water with the filter media is further increased.

16 Claims, 5 Drawing Sheets

U.S. PATENT DOCUMENTS

| | | |
|---|---|---|
| 5,217,616 A | 6/1993 | Sanyal et al. |
| 5,288,412 A | 2/1994 | Voorhees et al. |
| 5,393,419 A | 2/1995 | Tiede et al. |
| 5,445,740 A * | 8/1995 | Malone .................. 210/618 |
| 5,458,779 A * | 10/1995 | Odegaard ................ 210/616 |
| 5,490,924 A | 2/1996 | Macia et al. |
| 5,543,039 A | 8/1996 | Odegaard |
| 5,569,416 A | 10/1996 | Cross |
| 5,618,411 A * | 4/1997 | Donner et al. ............. 210/150 |
| 5,636,654 A | 6/1997 | Helm |
| 5,689,871 A | 11/1997 | Carstensen |
| 5,951,876 A | 9/1999 | Snowball |
| 5,985,148 A | 11/1999 | Liu |
| 6,015,490 A * | 1/2000 | Katsukura et al. ......... 210/151 |
| 6,080,304 A | 6/2000 | Gomi |
| 6,086,765 A * | 7/2000 | Edwards ................. 210/629 |
| 6,090,294 A | 7/2000 | Teran et al. |
| 6,209,926 B1 | 4/2001 | Mastro |
| 6,267,882 B1 | 7/2001 | Houck et al. |
| 6,363,598 B1 | 4/2002 | Staudt et al. |
| 6,402,964 B1 | 6/2002 | Schmid |
| 6,447,675 B1 | 9/2002 | James |
| 6,578,876 B2 | 6/2003 | Guertin, Jr. |
| 6,685,826 B1 | 2/2004 | James |
| 6,709,574 B2 | 3/2004 | James |
| 2003/0006178 A1 | 1/2003 | James |
| 2003/0145892 A1 | 8/2003 | Maldavs |
| 2004/0140576 A1 | 7/2004 | La Crosse |
| 2005/0062283 A1 | 3/2005 | Hawkinson et al. |

OTHER PUBLICATIONS

"Suspended Carrier Processes"; Purac/Technology/Suspended Carriers, http:/www.purac.se/se/suspend.htm, Apr. 4, 2000.

Rusten, Bjorn and Neu, Kenneth E., "Down to Size: Moving-bed Biofilm Reactors more into the small-flow treatment arena", Water Environment & Technology, Jan. 1999, pp. 27-33.

* cited by examiner

FILTRATION SYSTEM

BACKGROUND OF THE INVENTION

1. Field of the Invention

This invention relates to devices and methods for filtering water and, more particularly, to an improved fluid movement mechanism that increases efficiency of a filter.

2. Description of the Related Art

Bodies of water, such as those that are found outdoors, including fish ponds, are prone to contamination by bacteria, microorganisms, and other particles that reduce the purity of the water. Accordingly, systems and methods have been designed for reduction of these microorganisms and other unwanted particles in water. Some filtration systems comprise one or more containers with filter media enclosed therein, wherein the pond water is moved through the container and the filter media is configured to attract bacteria and other waste. For example, U.S. Pat. No. 6,685,826, titled "Fish Pond Filter System," which is hereby incorporated by reference in its entirety, describes such a filtration system.

Movement of water within current filtering containers is caused by water being forced into the filtering container by a pump. Thus, water tends to move through the filtering container in a generally uniform pattern, wherein the water repeatedly circulates in the same portions of the filtering container. Because movement of the water is caused only by the force of water being pumped into a filtering container, the amount of movement of the water is limited by the amount of water being pumped into the filtering container. Thus, the interaction between the water and the filter media, which is treated to kill microorganisms in the water, may not be sufficient to provide a desired level of filtration prior to the water being expelled from the filtering container. However, if the interactions between the filter media and the water could be increased, the amount of waste material attracted by the filter media would correspondingly be increased. Accordingly, systems and methods for increasing movement of water within filtering containers in order to increase interactions between the water and the filter media are desired.

In current filtration systems, the path of movement of the water within the container is typically repetitive, such as in a circular pattern. With the water moving in a repetitive pattern, carrying the filter media in the same pattern, the interaction of the water and the filter media is minimal and, thus, effectiveness of the filtering media is not minimized. However, if the water within a filtration container was urged to flow in a non-repetitive path, the water would interact differently with the filter media and, thus, the filtering efficiency of the filter would increase. Accordingly, systems and methods for increasing variation in a movement path of water within a filtration container are desired.

SUMMARY OF THE INVENTION

In one embodiment, a water filtration system for an ornamental body of water comprises a container comprising at least one opening for receiving water from an ornamental body of water, a plurality of filter media disposed in the container, wherein the filter media are treated to attract waste material from the received water, and a source of movement mounted on an outer surface of the container to force movement of the received water within the container so that contact between the filter media and the received water are increased and an efficiency of attracting waste material from the received water is increased, wherein the source of movement does not introduce water into the container.

In another embodiment, a water filtration system for an ornamental body of water comprises a container comprising a first opening for receiving water from an ornamental body of water, a pump configured to force water into the first opening in the container, a plurality of filter media disposed in the container, wherein the filter media are treated to attract waste material in the received water, and means for urging the water to circulate within the container in a non-repetitive pattern so that an efficiency of attracting waste material to the filter media is increased, wherein the urging means is at least partially mounted in a second opening of the container.

In another embodiment, a method of filtering water in an ornamental body of water, the method comprises pumping the water into a filtration container through a first opening, wherein the filtration container comprises a plurality of filter media treated to attract waste material within the water, and activating a source of movement that is mounted in a second opening of the filtration container so that the source of movement forces movement of the water and the filter media within the container in order to increase interactions between the filter media and the water.

In another embodiment, a filtration system for an ornamental body of water comprises an intake that intakes water from the ornamental body of water, a chamber that contains filtration media that interacts with the water from the ornamental body of water to filter the water, a first flow system that induces the water from the liquid to flow into and through the chamber in a first flow pattern, a second flow system that induces a second flow path in the water flowing in the chamber in the first flow pattern to thereby result in more random motion of the water in the chamber to facilitate interaction of the filtration media with the water, and an output line coupled between the chamber and the ornamental body of water to deliver the water from the chamber to the ornamental body of water.

DETAILED DESCRIPTION OF THE PREFERRED EMBODIMENT

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
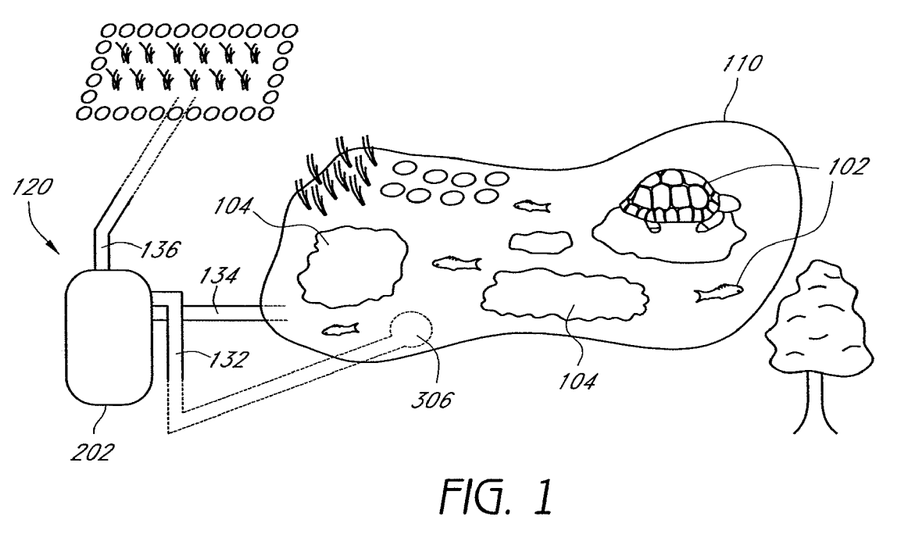
FIG. 1 is a diagram of a filtration system connected to filter water from a fish pond.

FIG. 1 is a diagram of a filtration system 120 connected to filter water from a fish pond 110. In the embodiment of FIG. 1, the filtration system 120 draws water from the fish pond 110, filters and/or otherwise treats the water to remove waste 104, and returns at least a portion of the water to the fish pond 110 via a return path 134. Exemplary filtration system 120 comprises a filtration container 202 configured to receive the water from the pond 110 via an inlet path 132.

The fish pond 110 may be outside or placed within a building or other enclosed structure. In one embodiment, for example, the fish pond 110 is an open air, closed-system container of water. The fish pond 110 may be home to a plurality of live organisms 102, including fish, crawdads, mud puppies, frogs, turtles, shrimps, or any other vertebrate or invertebrate animals suited to live at least partially in an aquatic environment. The organisms 102 generate waste 104, which may be partially semi-solid biological waste material. Waste 104 shall be herein understood to also include other material that may be found in the fish pond 110, such as leaves, vegetable matter, dirt, or insects, for example. While the filtration system 120 is discussed herein with respect to filtering of an exemplary fish pond 110, they are intended for use with any body of water, such as ornamental bodies of water with, or without, fish, and may be used to filter any body of water.

Figure 2:
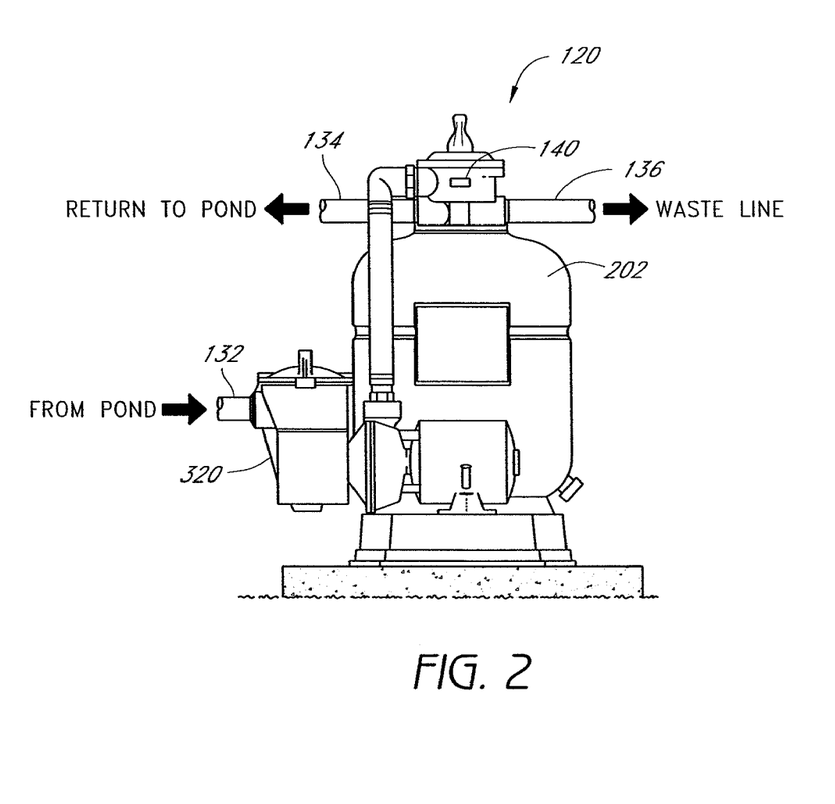
FIG. 2 is a side view of the filtration system of FIG. 1.

FIG. 2 is a side view of the filtration system 120 of FIG. 1. As illustrated in FIG. 2, the filtration system 120 comprises a pump 320 connected between the fish pond 110 and an inlet path 132, which typically includes one or more water pipes, that is coupled to the fish pond 110. In one embodiment, the pump 320 is adapted to pump water from the fish pond 110 to the inlet path 132 when supplied with electrical or mechanical power in any well known manner. Exemplary filtration system 120 includes a pre-filter 306 (FIG. 1) that may be used to screen out larger waste particles such as leaves, sticks, or dead fish which are approximately greater than ⅛" in two dimensions that could damage the pump 320 or plug up the filtration system 120. In the embodiment of FIG. 1, a waste path 136 extends from a filtration container 202 to an area that is suitable for discharge of water including unreacted waste.

As described in further detail below with reference to FIG. 3, the filtration container 202 may contain naturally occurring heterotrophic bacteria 310 that are configured to metabolize at least some of the biological waste 304 that is generated and accumulated in the fish pond 110. Through use of this heterotrophic bacteria, the chemical treatment that a user of the filtration system 120 needs to employ to maintain the health and appearance of the fish pond 110 may be reduced. Thus, the filtration system 120 may reduce the inconvenience and health risks associated with handling chemicals that may be used to filter unwanted biological waste from a body of water. In other embodiments, the filtration container 202 may container any other material suitable for reducing biological or other waste within the water from the fish pond 110.

Figure 3:
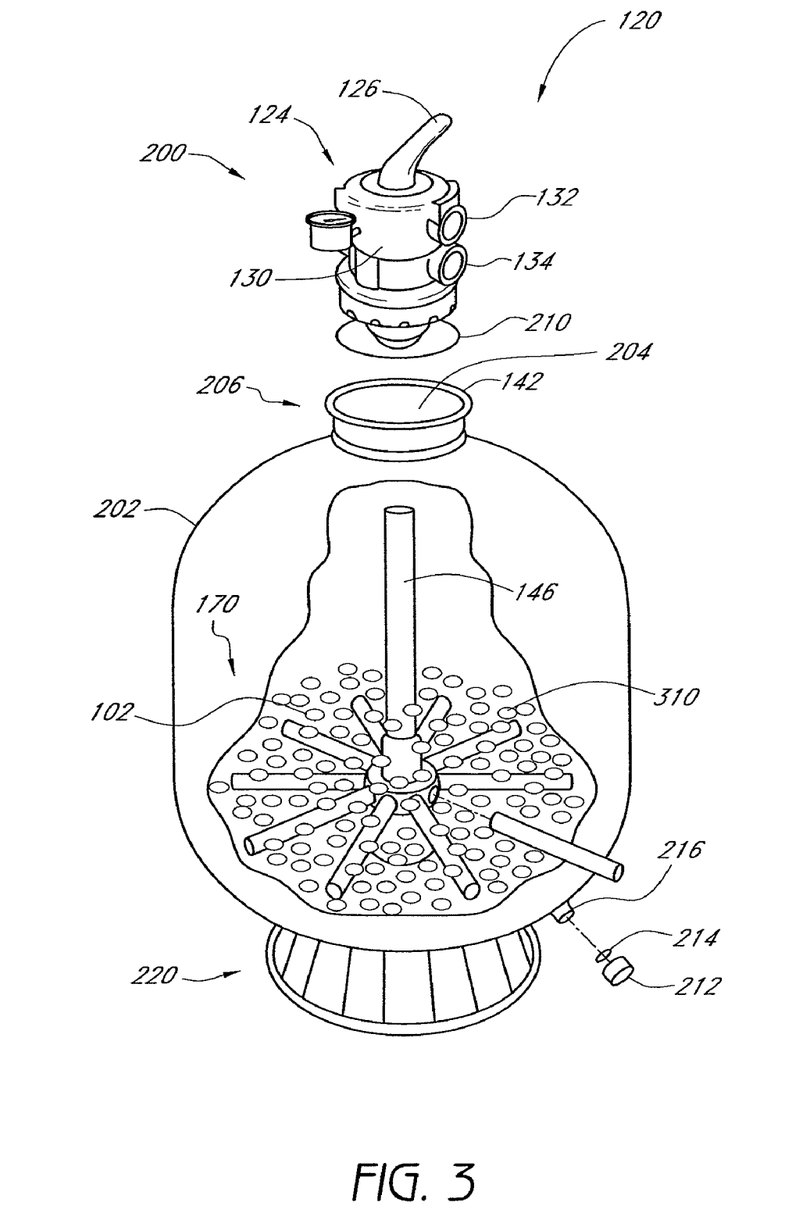
FIG. 3 is a partially cut-away perspective view of the filtration container of FIG. 2.

FIG. 3 is a partially cut-away perspective view of the filtration container 202 and exemplary water inlet and outlet components. The exemplary container 202 is typically a hollow, closed structure made of a plastic material. In one embodiment, the container 202 is sized and adapted to hold approximately 15 to 150 liters of water. However, the container 202 may be sized to adequately filter any volume of water. In the embodiment of FIG. 3, an opening 204 comprises a generally circular through-going hole in a top end 206 of the container 202 and is approximately 6" in diameter. In other embodiments, the opening 204 may be sized larger or smaller and may be located in other suitable locations on the container 202.

In the embodiment of FIG. 3, a water flow controller 124 is partially inserted into the container 202 through the opening 204. An O-ring 210 may be placed between the top end 206 of the container 202 and a valve body 130. In one embodiment, the O-ring 210 is generally a toroid approximately 6" in overall diameter and ¼" in cross-section and is made of a rubber material. The O-ring 210 inhibits water flow out of the container 202. In the embodiment of FIG. 3, an attachment flange 142 is removably attached to the container 202 so as to secure the water flow controller 124 to the container 202 and also so as to hold the O-ring 210 between the container 202 and the water flow controller 124 in compression.

In the embodiment of FIG. 3, the container 202 comprises a bottom end 220 opposite the top end 206. In one embodiment, the container 202 also comprises a drain hole 216 adjacent the bottom end 220. In one embodiment, the drain hole 216 is a through-going hole in the container 202 and may be provided with internal, female threads. The container 202 may also include a drain plug 212 and gasket 214. In one embodiment, the drain plug 212 comprises a brass assembly with external, male threads, and is sized and threaded so as to be removably threaded into the drain hole 216 so as to hold the gasket 214 between the container 202 and the drain plug 212. The drain plug 212 and gasket 214 inhibit water flow out of the container 202 when they are inserted into the container 202. Removal of the drain plug 212 and gasket 214 allow water contained within the container 202 to freely flow out of the container 202.

In one embodiment, water entering the filtration system 120 is drawn from the fish pond 110 and includes waste 104. The water enters at the top end 206 of the container 202 and exits adjacent the bottom end 220. In one mode of operation, the valve handle 126 is positioned so that water flows freely into the inlet pipe 132 and exits a bottom end of the valve body 130. Thus, the water flow is generally downwards. In the embodiment of FIG. 3, a plurality of filter media 102 are inserted into the container 202 prior to the attachment of the water flow controller 124. In one embodiment, the filter media 102 are generally hollow, plastic structures with a plurality of external ribs and internal dividing walls, which may also be referred to as bio-tubes. The filter media 102 advantageously have a high surface area-to-volume ratio and can support a high volumetric density of naturally occurring heterotrophic bacteria. In an advantageous embodiment, heterotrophic bacteria establish colonies on the internal and external surfaces of the filter media 102 and biologically metabolize waste that is trapped on the filter media 102. The optimal filter media 120 provides the highest surface area-to-volume ratio possible. An exemplary filter media 102 having a higher surface area to volume ratio than gravel or fibers is the ACE-1400 media. The ACE-1400 media is made of plastic tubing with a specific gravity slightly less than one, which is cut to be slightly longer than the diameter of the tubing. The ACE-1400 is approximately 3.5 mm in diameter and 5 mm long. It can be appreciated that a hollow tube can support bacteria on both the outer and the inner surface. The size and shape of the hollow tube media is such that it has 15 to 20 times the surface area of an equivalent volume of gravel or fiber matting.

As the water passes through container 202 containing the filter media 102, waste 104 in the water is trapped on the surfaces of the filter media 102. In one embodiment, the trapped waste 104 serves as food material for heterotrophic bacteria on the surfaces of the filter media 102. In one embodiment, the heterotrophic bacteria are naturally occurring in the fish pond 110 and are carried into the filtration system 120 during use. Over time, the heterotrophic bacteria 310 establish colonies on the surface of and within the filter media 102. In one embodiment, the heterotrophic bacteria metabolize the waste 104 that becomes trapped on and within the filter media 102 and substantially transform the waste 304 into forms which are more aesthetically pleasing in the fish pond 110 and which are not harmful to the health of the fish 102 in a well known manner. For example, the heterotrophic bacteria may metabolize nitrogenous compounds such as ammonia.

Movement of water within the container 202 of FIG. 3 is caused by water being forced into the container by a pump. Thus, water tends to move through the container in a generally uniform pattern, wherein the water repeatedly circulates in the same portions of the filtering container. Because movement of the water is caused only by the force of water being pumped into a container, the amount of movement of the water, and the corresponding interaction between the filter media 102 and the waste 104 in the water, is limited by the amount of water being pumped into the filtering container.

Figure 4:
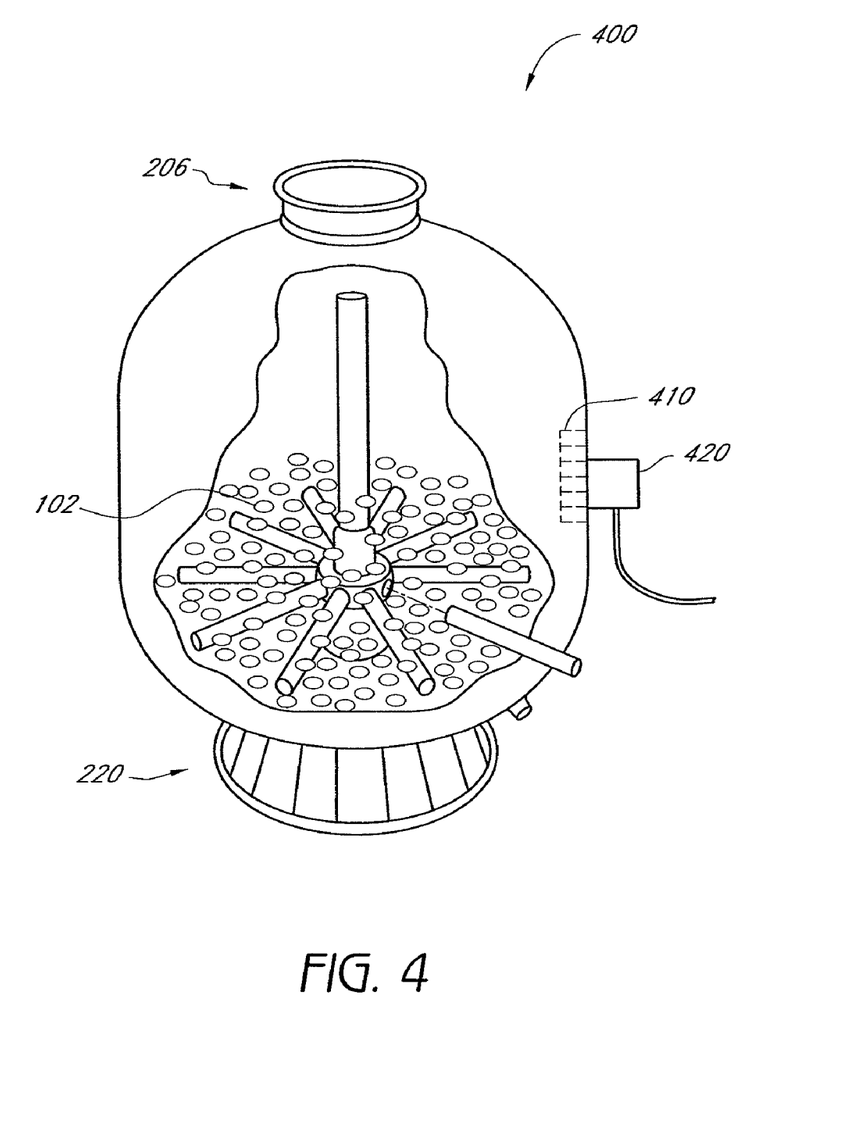
FIG. 4 is a partially cut-away perspective view of a filtration container with an impeller mounted on an outer surface of the container.

FIG. 4 is a partially cut-away perspective view of a filtration container 400 with an impeller 410 mounted on an outer surface of the container 400. In the embodiment of FIG. 4, the impeller 410 is mounted on about the middle of a side of the container 400. However, in other embodiments, the impeller 410 may be mounted at other locations on the container 400. The impeller 410 is coupled to a source of rotation 420, such as a motor, which may be electrically powered. When the source of rotation 420 is activated, the impeller 410 rotates within the container 400, interacting with the water in the container 400 and forcing the water to move within the container 400. In an advantageous embodiment, the impeller 410 increases movement of water within the container 400, which increases an amount of contact between the water and the filter media 102, and, thus, increases an amount of filtering performed in the filtration container 400. In addition, in some embodiments, the impeller 410 causes the water within the container 400 to move in a non-repeating path within the container 400, further increasing interaction between the waste 104 and the filter media 102 and increasing a level of filtration provided by the filtration container 400.

In prior art embodiments, movement of water within a filtering container is caused by water being forced into the filtering container by a pump. Thus, in these prior art embodiments, movement of the water tends to be generally uniform, wherein the water circulates in the same portions of the filtering container. Accordingly, the filter media contained in these prior art filtering containers tends to contact certain portions of the water repeatedly and more frequently than other portions of the water. This repetitive movement of water in the filtering container provides sub-optimal filtering of the water as portions of the water and filter media settle on the bottom of the container, for example, and do not interact. In contrast, the improved filtration container 400 is fitted with an impeller 410 that increases movement of water within the container 400 and causes the water to move in non-repeating paths within the container 400, thus increasing contact of the water with the filter media. In the embodiment of FIG. 4, the water being forced into the container by a pump produces a first flow system within the container, wherein the flow of water caused by the pump is in a generally circular of helixical pattern. A second flow system is created by the impeller 410, wherein the second flow system and the first flow system interact so that the movement of water within the container 400 is increased and a movement path is substantially non-repeating.

Figure 5:
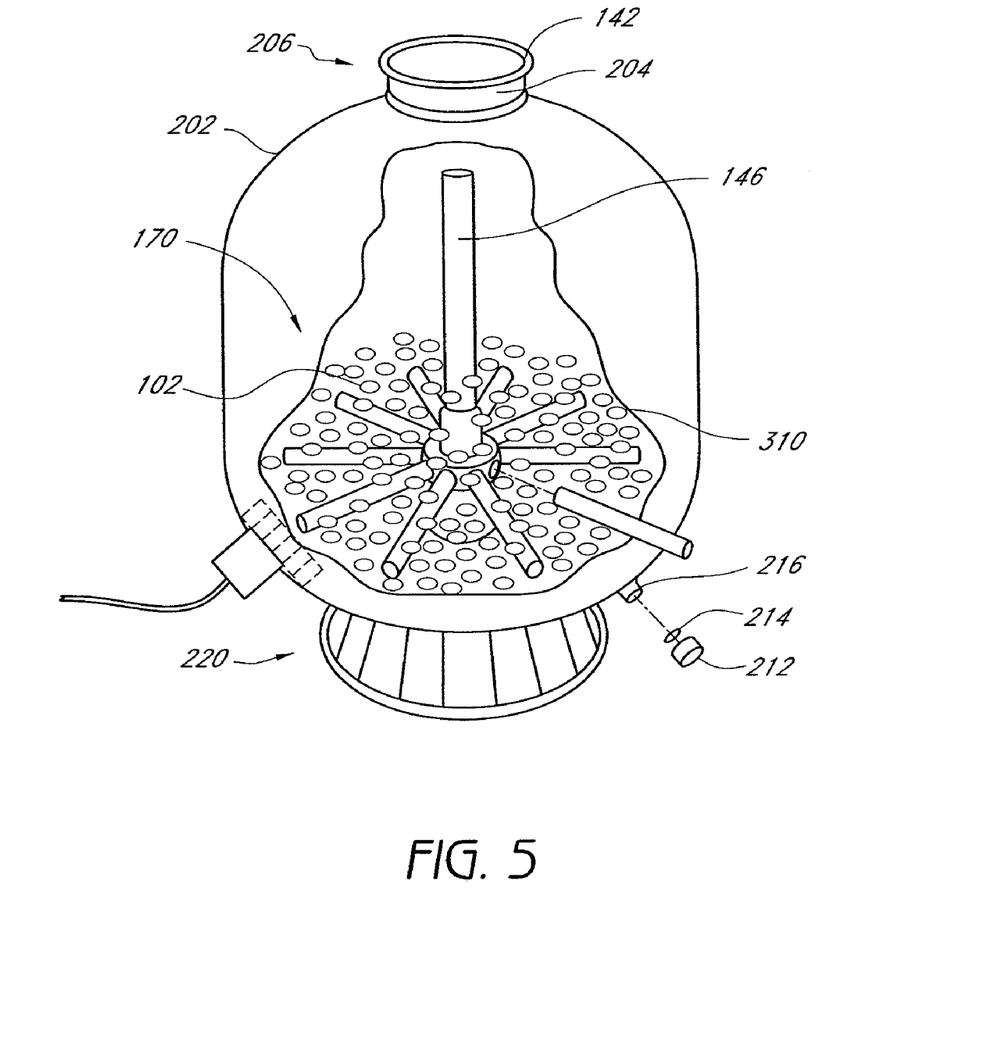
FIG. 5 is a partially cut-away perspective view of a filtration container with the impeller mounted on an outer surface of the container.

FIG. 5 is a partially cut-away perspective view of a filtration container 500 with the impeller 410 mounted on an outer surface of the container 500. As illustrated in FIG. 5, the impeller 410 is located in a lower portion of the container 500. In the embodiment of FIG. 5, the impeller 410 increases movement of water within the container 500. Advantageously, movement within the container 500, and interaction between, the water and filter media 102 within the container 500 are increased through use of the impeller 410. As noted above, the increased movement of the water within the container 500 may also be in a path that is substantially non-repeating, wherein interaction of the water with the filter media is increased.

Figure 6:
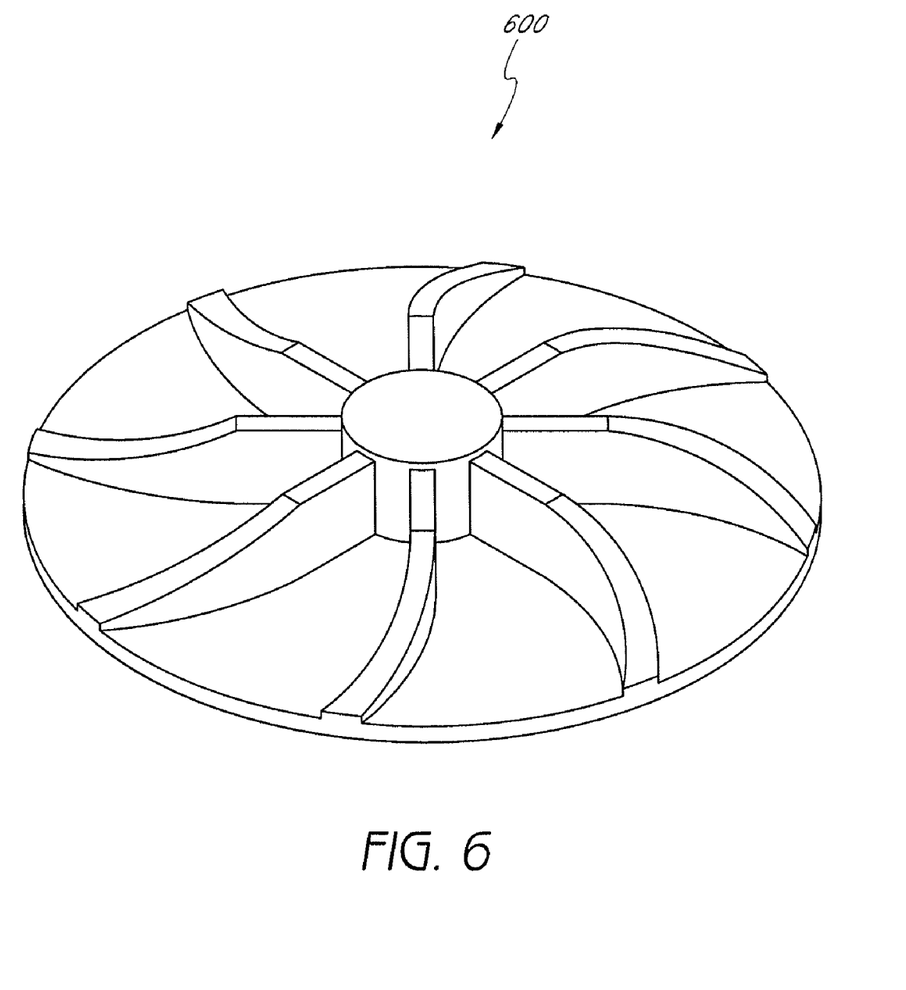
FIG. 6 is a perspective view of an exemplary impeller that may be mounted on a filtration container.

FIG. 6 is a perspective view of an exemplary impeller 600 that may be mounted on a filtration container. As noted above with respect to FIGS. 4-5, an impeller, such as impeller 600 may be mounted on a filtration container in order to increase movement of the contents of the filtration container. In some embodiments, the impeller 600 not only increases movement of the content of the filtration container to which it is coupled, but also causes the content to move in a substantially non-repetitive path within the filtration container.

In certain embodiments, an alternative source of movement, rather than an impeller, may be used in order to achieve similar effects. For example, an inlet and outlet of a circulation pump may be coupled to a filtration container so that the circulation pump provides increased movement of the fluid and filter media within the filtration container.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A water filtration system for a fish pond containing water and one or more fish living in the water, the system comprising:

a container comprising at least one opening for receiving water from the fish pond, the container configured to contain about 15 to 150 liters of water;

a plurality of filter media disposed in the container, wherein the filter media are treated to attract waste material from the received water; and     an impeller mounted in an opening on a side surface of the container to force movement of the received water within the container so that the water within the container flows in a non-repeating pattern such that contact between the filter media and the received water are increased and an efficiency of attracting waste material from the received water is increased, wherein the impeller does not introduce water into the container;

an output tubing connected to an output opening of the container, wherein the output tubing receives water from the container and guides the water from the container back to the fish pond.

2. The filtration system of claim 1, wherein the source of movement forces movement of at least some of the filter media in the received water in a substantially non-repetitive path within the container.

3. The filtration system of claim 1, wherein at least a portion of the filter media each comprise an elongate, hollow, open-ended cylinder.

4. The filtration system of claim 3, wherein at least a portion of the filter media each include a surface configured to support the growth of heterotrophic bacteria.

5. The filtration system of claim 4, wherein portions of the waste material in the received water serves as food for the heterotrophic bacteria supported on the filter media.

6. The filtration system of claim 4, wherein the heterotrophic bacteria metabolize portions of the waste material in the water.

7. The filtration system of claim 1, wherein the impeller is mounted on a side of the container so that some of the plurality of filter media are elevationally higher than the impeller.

8. A water filtration system for an ornamental body of water, the system comprising:
- a container comprising a first opening for receiving water from an ornamental body of water;
- a pump configured to force water into the first opening in the container;
- a plurality of filter media disposed in the container, wherein the filter media are treated to attract waste material in the received water;
- means for urging the water to circulate within the container in a non-repetitive pattern so that an efficiency of attracting waste material to the filter media is increased, wherein the urging means comprises an impeller mounted in a second opening on a side of the container; and
- an output tubing connected to a second opening of the container, wherein the output tubing receives water from the container and guides the water from the container back to the ornamental body of water.

9. The water filtration system of claim 8, wherein at least a portion of the filter media each comprise an elongate, hollow, open-ended cylinder.

10. The water filtration system of claim 8, wherein heterotrophic bacteria are coupled to at least a portion of the filter media, the heterotrophic bacteria feeding off of portions of the waste material.

11. A method of filtering water in fish pond, the method comprising:
- pumping water from the fish pond into a filtration container through a first opening, wherein the filtration container comprises a plurality of filter media treated to attract waste material within the water;
- activating a source of movement comprising an impeller that is mounted in a second opening on a side of the filtration container so that the source of movement forces movement of the water and the filter media within the container in order to increase interactions between the filter media and the water; and
- expelling water from the filtration container into an output tubing that guides the water back to the fish pond.

12. The method of claim 11, wherein the increased interactions between the filter media and the water causes an increased portion of waste material in the water to be attracted to the filter media.

13. The method of claim 11, wherein at lest some of the filter media is contained in one or more bio-tubes.

14. A filtration system for an ornamental body of water, the filtration system comprising:
- an intake that intakes water from the ornamental body of water;
- a chamber that contains filtration media that interacts with the water from the ornamental body of water to filter the water;
- a first flow system that induces the water from the liquid to flow into and through the chamber in a first flow pattern;
- a second flow system comprising an impeller mounted in an opening on a side of the chamber that induces a second flow path in the water flowing in the chamber in the first flow pattern to thereby result in more random motion of the water in the chamber to facilitate interaction of the filtration media with the water; and
- an output line coupled between the chamber and the ornamental body of water to deliver the water from the chamber to the ornamental body of water.

15. The filtration system of claim 14, wherein the first flow pattern comprises a generally circular path.

16. The filtration system of claim 14, wherein the second flow path randomizes the first flow pattern, thus causing the water to flow in a substantially non-repeating path.

* * * * *